United States Patent [19]

Maresca et al.

[11] Patent Number: 4,725,647

[45] Date of Patent: * Feb. 16, 1988

[54] PROCESS FOR PREPARING POLYESTERS IN THE PRESENCE OF A PROCESSING AID

[75] Inventors: Louis M. Maresca, Belle Mead; Markus Matzner, Edison, both of N.J.

[73] Assignee: Amoco Corporation, Chicago, Ill.

[*] Notice: The portion of the term of this patent subsequent to May 31, 2000 has been disclaimed.

[21] Appl. No.: 669,424

[22] Filed: Nov. 8, 1984

Related U.S. Application Data

[63] Continuation of Ser. No. 296,871, Aug. 27, 1981, abandoned.

[51] Int. Cl.$^4$ .................... C08L 61/04; C08L 67/02; C08F 8/00

[52] U.S. Cl. ...................... 525/68; 525/173; 525/174; 525/175; 525/176; 525/177; 525/437; 525/439; 525/440; 525/444; 525/445; 525/448; 528/182

[58] Field of Search ............... 525/68, 173, 174, 175, 525/176, 177, 437, 439, 440, 444, 445, 448; 528/182

[56] References Cited

U.S. PATENT DOCUMENTS 4,374,239  2/1983  Berger et al. ................ 528/182
4,386,186  5/1983  Maresca et al. ............... 525/68

Primary Examiner—Lucille M. Phynes
Attorney, Agent, or Firm—Donald M. Papuga; William H. Magidson; Ralph C. Medhurst

[57] ABSTRACT

Described herein is a process for preparing polyesters which comprises reacting a dihydric phenol with a diester derivative of an aromatic diacid in the presence of from about 10 to about 60 weight percent of a processing aid having a boiling point of greater than about 200° C., under polyester forming conditions.

2 Claims, No Drawings

PROCESS FOR PREPARING POLYESTERS IN THE PRESENCE OF A PROCESSING AID

This application is a continuation of our prior U.S. application Ser. No. 296,871, filing date Aug. 27, 1981, now abandoned 7-21-87.

BACKGROUND OF THE INVENTION

This invention is directed to a process for preparing polyesters which process comprises reacting a dihydric phenol with a diester derivative of an aromatic diacid in the presence of from about 10 to about 60 weight percent, based on the weight of the polyester produced, of a processing aid having a boiling point of greater than about 200° C. under polyester forming conditions.

Polyarylates are polyesters derived from a dihydric phenol, particularly 2,2-bis(4-hydroxyphenyl) propane, also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyesters. One such process is the diphenyl ester process.

The diphenyl ester process, generally involves two steps. In the first step, diphenyl iso- and/or terephthalates are prepared by the reaciton of phenol with iso-or terephthalic acids, or mixtures thereof, at a temperature of about 180° to about 350° C. in the presence of a catalyst. In the second step, the diphenyl iso- and/or terephthalates are reacted with bisphenol-A in the presence, optionally, of a catalyst at a temperature of from about 200° to about 350°. However, heretofore, this process has been carried out by several different methods all suffering from serious deficiences as illustrated in the following patents:

U.S. Pat. No. 3,395,119 describes the preparation of copolyesters by reacting (a) bisphenol A with (b) 70-10 mole percent of a diaryl terephthalate, (c) 25-89 mole percent of a diaryl isophthalate and (d) 1-5 mole percent of a diaryl carbonate present in the reaction mixture. The volatile reaction products are removed until a copolyester having a relative viscosity of greater than 1.6 is obtained. However, this process is applicable to the production of polyesters having ester and carbonate linkages and not to polyarylates having carbonate-free linkages. Also, as described in Examples 1 and 3 of U.S. Pat. No. 3,395,119, the polyester tends to develop color. Further, a vacuum is required during polymerization.

U.S. Pat. No. 3,972,852 describes the preparation of polyesters by reacting in a molten state (a) an aromatic dicarboxylic acid or an ester-forming derivative thereof, with (b) a diphenol to prepare a polymer, which is then further polymerized in the solid phase to prepare the linear aromatic polyester. The reaction is carried out in the presence of at least one dihydroxy compound or a carboxylic acid ester thereof. The Examples demonstrate carrying out the reaction in the presence of a catalyst. The catalysts include titanium compounds, an antimony compound or an organo tin compound. However, in order to obtain good results the process requires the use of an aliphatic diol as a correactant. Aliphatic diols have deleterious effects on polymer thermal stability. Also, in this patent, the preparation of the polyester is achieved by a solid phase polymerization which is a very cumbersome process.

U.S. Pat. No. 4,124,566 describes a process for preparing polyesters by a first step of esterifying (a) a difunctional carboxylic acid containing at least 60 mole percent of an aromatic dicarboxylic acid, (b) 0 to 80 mole percent of an aliphatic diol and/or a dihydroxybenzene, and (c) an aromatic hydroxy compound until the degree of esterificatin reaches at least 80 percent. The second step comprises adding 0 to 80 mole percent of component (b) and (d) a bisphenol to the reaction product obtained in the first step and reacting the mixture. At least the first of the above steps is conducted in the presence of an aromatic hydrocarbon medium which has a boiling point of 105° to 175° C. The aromatic hydrocarbons are described as lower alkyl substituted benzenes. However, the use of a vacuum is required during polymerization.

Thus, the diphenyl ester processes for producing polyesters by the procedures of the aforediscussed U.S. Patent are generally unsuitable since they employ severe reaction conditions and produce highly colored and thermally unstable polymer.

Therefore, a need exists for a practical diphenyl ester process for producing high molecular weight polyesters with good color and thermal stability.

The utilization of from about 10 to about 60 percent of a processing aid is beneficial in that the viscosity of the system is decreased. This decrease in viscosity provides a faster reaction time since better mixing of the reactants occurs which allows the reaction to proceed under kinetic control. Additionally, by using the processing aid, reaction times are relatively short so that the polyester produced possess vastly improved color, as compared to those prepared under reaction conditions described in the prior art. Furthermore, the present process can be carried out at atmospheric pressure and therefore avoids the use of the costly equipment which is needed by the prior art processes which carry out the diphenyl ester process under vacuum.

Finally the use of the processing aid prevents the occurrence of undesirable "hot spots" which produce colored degradation products hich contribute to the instability of the produced polyester.

One problem which exists in the diphenyl ester process for producing polyesters is that when a dihydric phenol is reacted with a diester derivative of an aromatic diacid in the molten state codistillation of the diester and diphenol with the phenol occurs. This disrupts the stoichiometry of the reaction and the polyester produced is not of acceptable molecular weight. The use of a processing aid alleviates this problem; it also prevents sublimation and allows for the selective separation of phenol from the other coreactants.

DESCRIPTION OF THE INVENTION

The present invention is directed to a process for the preparation of polyesters which process comprises reacting a dihydric phenol with a diester derivative of an aromatic diacid in the presence of from about 10 to about 60 weight percent, based on the weight of the polyester produced, of a processing aid having a boiling point of greater than about 200° C. under polyester forming conditions.

The aromatic diacid which can be used herein includes terephthalic acid, isophthalic acid, orthophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixture of isophthalic and terephthalic acids are used. The isophthalic acid to terephthalic acid ratio in the mixture is about 20:80 to about 100:0 while the most preferred acid ratio is about 25:75 to about 75:25. Also, from about 0.5 to about 20 percent of aliphatic diacids containing from 2 to about 10 carbon atoms, such as adipic acid, sebacic acid, and the like may be additionally used in the polymerization reaction.

These acids are converted to their diesters by reaction with an aromatic alcohol such as phenol at a temperature of from about 180° to about 350° and a pressure of from about atmospheric to about 500 psi. A catalyst may be used. These catalysts include sodium, potassium, lithium, calcium, magnesium, barium, tin, strontium, zinc, iron, aluminum, cobalt, lead, nickel, titanium, manganese, or antimony, and compounds of these etals such as their oxides, hydrides, hydroxides, halides, inorganic acid salts, organic acid salts, complex salts, double salts, alcoholates, or phenolates. Preferred catalysts include alkali and alkaline earth metal alkoxides and phenoxides. Other preferred catalysts include titanium compounds such as titanium tetrabutoxide, titanium oxalate, or titanium oxide, tin compounds such as dibutyltin oxide, antimony compounds, such as antimony trioxide, and silicon tin compounds such as the following:

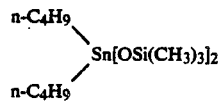

The acids may also be converted to their diesters by reaction with an aliphatic alcohol, such as methanol and an acid catalyst under conditions well known is the prior art. Such a diester may be further reacted with an aromatic compound, such as phenol or phenyl acetate in the presence of a catalyst to form the aromatic diester derivate of the aromatic diacid as described in U.S. Pat. No. 3,413,366.

The dihydric phenols that may be used in this invention include the following:
2,2-bis(4-hydroxyphenyl)propane,
bis-(2-hydroxyphenyl)methane,
bis-(4-hydroxyphenyl)methane
bis-(4-hydroxy-2,6 dimethyl-3- methoxyphenyl) methane
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-methyl-4-hydroxyphenyl)propane,
2,2-bis-(3-isopropyl-4-hydroxyphenyl) propane,
2,2-bis-(2-isopropyl-4-hydroxyphenyl) propane,
2,2-bis-(4-hydroxyphenyl)pentane,
3,3-bis-(4-hydroxyphenyl)pentane,
2,2-bis-(4-hyroxyphenyl)heptane,
1,2-bis-(4-hydroxyphenyl)1,2-bis-(phenyl) propane,
4,4'-(dihydroxyphenyl)ether,
4,4'-(dihydroxyphenyl)sulfide,
4,4'-(dihydroxyphenyl)sulfoxide,
hydroquinone, and
naphthalene diols.

Furthermore, up to 80 mole percent of the diol component may be an aliphatic diol such as ethylene glycol, neopentyl glycol, and the like.

The preparation of the polyester is carried out in the presence of from about 10 to about 60, more preferably from about 25 to about 60, and most preferably, from about 30 to about 60 weight percent, based on the weight of the polyester produced, of a processing aid.

The preferred processing aids are diphenyl ether compounds, a cycloaliphatic substituted aromatic or heteroaromatic compound, and a halogenated and/or etherated substituted aromatic or heteroaromatic compound, or mixtures of these.

The diphenyl ether compound may be substituted. These substituents are selected from alkyl groups, chlorine, bromine or any substituent which does not interfere with the polyester forming reaction or the reaction forming the diester derivative of the dihydric phenol. Additionally, the diphenyl ether compound may be used with up to 50 weight percent of other compounds, such as various biphenyls or any other compounds which do not interfere with the polyester forming reaction or the reaction forming the diester derivative of the aromatic diacid.

The cycloaliphatic compounds, or substituted aromatic or heteroaromatic compounds contain at least one benzylic and/or tertiary hydrogen atom. These compounds have a boiling point of from about 200° to about 280° C., at atmospheric pressure. Additionally, these compounds have a solubility parameter, at a temperture of 250° C., of ±4 within the solubility parameter of the polyester being produced. Solubility parameter is a measure of correlating polymer solvent interaction. It is defined in "Properties of Polymers", D. W. Van Krevelen, Elsevier Scientific Publishing Co., Amsterdam-Oxford-N.Y., 1976, pp. 141–155, as the square root of the cohesive energy density.

The cycloaliphatic compounds are of the following formulae:

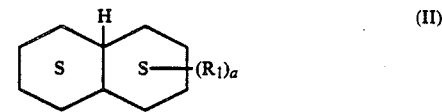

wherein $R_1$ is independently alkyl of 1 to 6 carbon atoms, cycloalkyl of 6 to 18 carbon atoms, and a is an integer of 1 or 2.

The substituted aromatic compounds are of the following formula:

wherein $R_2$ is independently cylcoalkyl of 6 to 18 carbon atoms and aralkyl or alkaryl of 7 to 18 carbon atoms and wherein the carbon atom of $R_2$ attached directly to the benzene nucleus has 1 or 2 attached hydrogen atoms, and b is an integer of 1 to 6.

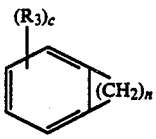

(IV)

wherein $R_3$ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

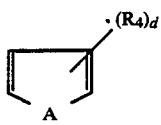

(V)

wherein A is S, O, or —CH═N—, $R_4$ is independently alkyl of 1 to 6 carbon atoms, or cycloalkyl of 6 to 18 carbon atoms and wherein the cabon atom of $R_4$ attached directly to the heteroaromatic nucleus has 1 or 2 attached hydrogen atoms, and d is an integer of 1 to 4.

Additionally, the cycloaliphatic, substituted aromatic or heteroaromatic compounds may be used with up to 90 weight percent of other compounds such as diphenyl ether, dimethysulfone, etc.

The halogenated and/or etherated substituted aromatic or heteroaromatic compounds are of the formulae:

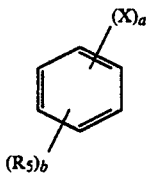

(VI)

wherein X is independently Cl, Br F, or $OR_6$, a is an integer of 1 to 5, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and b is integer of 0, 1 or 2;

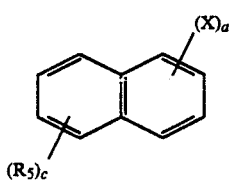

(VII)

wherein X, $R_1$ and a are as previously defined, and c is an integer of 0 to (8-a).

The heteroaromatic compounds are of the following formula:

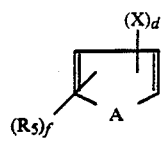

(VIII)

wherein A is O, S, or —CH═N—, X and $R_5$ are as previously defined, d is an integer of 1 to 4 and f is integer of 0 to (4-d).

The compounds encompassed by structures (VI) through (VIII) include 1,2,3-trichlorobenzene; 1,2,4-trichlorobenzene, 1,2,3- or 1,2,4- or 1,3,5-trimethoxybenzen 1,2- or 1,3- or 1,4-dibromobenzene; 1-chloronaphthalene; 2-chloronaphthalene; 1-bromona- phthalene; 2-bromonaphthalene; 1,2- or 1,3- or 1,4-dimethoxybenzene; 2-bromotoluene; 4-bromotoluene; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, diphenyl sulfone etc.

The amount of said processing aid could vary during the polymerizaton reaction. For example, it may be advantageous to increase progressively the amount of these processing aids to maintain the reaction medium at constant viscosity.

A catalyst may be used to accelarate the transesterification reaction. Examples of the catalyst are elemental metals such as sodium, potassium, lithium, calcium, magnesium, barium, tin, strontium, zinc, iron, alumlnum, cobalt, lead, nickel, titanium, manganese, or antimony, and compounds of these metals such as their oxides, hydrides, hydroxides, halides, inorganic acid salts, organic acid salts, complex salts, double salts, alcoholates, or phenolates. Preferred catalysts include alkaline earth metal alkoxides and phenoxides. Other preferred catalysts include titanium compounds such as titanium tetrabutoxide, titanium oxalate, or titanium oxide, tin compounds such as dibutyltin oxide, antimony compounds, such as antimony trioxide, and silicon tin compounds such as the following:

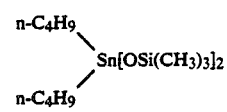

The catalyst is present in the reaction mixture in a catalytically effective amount which can be, for example, from about 1 to about 1000, preferably from about 10 to about 50, parts per million, based on the weight of the polyester produced.

The polyester may be prepared by adding the dihydric phenol, diester derivative of an aromatic diacid, processing aid, and optionally catalyst to a reaction zone and carrying out the polymerization. Any combination of adding the dihydric phenol, diester derivative of an aromatic diacid, processing aid, and optionally catalyst to a reaction vessel may be used.

Additionally, a carbonate such as diphenyl carbonate may be added to the reaction mixture in order to produce a poly(ester carbonate).

In another embodiment of this invention, the diester derivative of the aromatic diacid is prepared in the reaction zone by reacting the diacid with a phenol under the conditions described, supra. The dihydric phenol, and optionally a carbonate such as diphenyl carbonate, the processing aid, and optionally, catalyst is then added to the reaction zone and the polymerization reaction carried out to produce the polyester or poly(ester carbonate).

The polymerization process of this invention is carried out under polyester forming conditions, i.e., at a temperature of from about 200° to about 350° C., and preferably, from about 250° to about 310° C. The polymerization process in generally conducted in an inert atmosphere (such as argon or nitrogen) so that the oxygen content therein is minimized or eliminated. The process is preferably carried out at a pressure sufficient to have the processing aid refluxing at the reaction temperature. This pressure is generally atmospheric. Lower and higher pressures may also be used.

The polymerization reaction is conducted for a period of time sufficient to produce a polyester, i.e., a polyarylate or a poly(ester carbonate), having a reduced viscosity of at least about 0.1 to greater than 1.0 dl/gm, which time is generally less than about 10 hours. The reaction time is generally in the range of from about 4 hours to about 8 hours, depending on the particular polyester being prepared.

The polymerization reaction of this invention may be carried out batchwise or continuously and by using any apparatus desired.

The process of this invention produces polyesters having a reduced viscosity of from about 0.1 to greater than about 1.0, preferably from about 0.2 to about 0.8 dl/gm, as measured in chloroform (0.5 g/dl chloroform) or other suitable solvent at 25° C. In those instances where the polyester is not soluble in chloroform, other solvents known in the art, such as parachlorophenol, phenol/tetrachloroethane (60:40), and the like, may be used. Reduced viscosities of the polyesters measured in these solvents generally have the same range as those measured in chloroform.

The polyester produced contains from 1 to 99 ester linkages or from 99 to 1 carbonate likages depending upon the reactants used in the polymerization.

The polyesters may be prepared in the presence of materials such as molecular weight regulators, antioxidants, and the like.

In another embodiment of this invention the polymerization reaction can be carried out in the presence of one or more thermoplastic polymers such as polyesters, polycarbonates, styrene polymers, alkyl acrylate polymers, polyurethanes, poly(aryl ether) polymers, polyamides, polyimides, poly(amide imides), poly(ether imides), polyhydroxy ether polymers, copolyetherester block copolymers, and the like to produce novel polymeric materials.

The polyesters obtained by the process of this invention may be used together with the well-known additives such as plasticizers, pigments, lubricating agents, mold release agents, stabilizers, inorganic fillers, and the like.

EXAMPLES

The following examples serve to give specific illustrations of the practice of this invention but they are not intended in any way to limit the scope of this invention.

EXAMPLE 1

A three neck, 250 ml round bottom flask was equipped with a mechanical stirrer, a nitrogen inlet and a vacuum jacketed vigreux column with a distillation head and receiver. The flask was charged with 15.90 g (0.050 moles) of diphenyl isophthalate, 15.90 g (0.050 moles) of diphenyl terephthalate, 23.26 g (0.102 moles) of bisphenol A and 23.87 g of diphenyl ether. The system was purged with nitrogen for 1 hour at room temperature (about 25° C.). While maintaining a constant nitrogen sparge the reaction mixture was heated to 280° C. Phenol began to distill at about 250° C. After 6 hours at 280° C. the reaction was cooled to room temperature and dissolved in 200 ml of methylene chloride. Coagulation in 1000 ml of methanol resulted in the percipitation of the polyarylate as a white powder. After several methanol washes the polymer was dried in a vacuum oven for about 12 hours at 120° C.

The reduced viscosity of the dried polymer was measured in chloroform (0.50 g/100 ml) at 25° C. and found to be 0.33 dl/g.

EXAMPLE 2

The procedure as described in Example 1 for preparing polyarylates was repeated except that at the beginning of the reaction in addition to the other reactants 0.036 g of magnesium acetate was charged into the reactor.

The resulting polymer had a reduced viscosity of 0.40 dl/g.

EXAMPLE 3

The procedure described in Example 1 was repeated exactly except that 1,3,5-trimethoxy benzene was used instead of diphenyl ether.

The resulting polymer had a reduced viscosity of 0.33 dl/g.

EXAMPLE 4

The procedure described in Example 1 was followed except that the original charge contained 12.72 g (0.04 moles) of diphenyl isophthalate, 12.72 g (0.04 moles) of diphenyl terephthalate, 23.03 g (0.101 moles) of bisphenol A 4.28 g (0.02 moles) of diphenyl carbonate and 22.38 g of diphenyl ether. In addition, the reaction was allowed to remain at 250° C. for 1 hour prior to going to 280° C. where it was held for 5 hours.

The resulting poly(ester-carbonate) had a reduced viscosity of 0.48 dl/g.

EXAMPLE 5

The procedure described in Example 1 was exactly repeated except that the original charge contained 15.90 g (0.050 moles) of diphenyl isophthalate, 15.90 g (0.050 moles) of diphenyl terephthalate, 18.24 g (0.080 moles) of bisphenol A, 1.24 g (0.020 moles) of ethylene glycol and 21.65 g of diphenyl ether. In addition, the reaction was held at 180° C. for 1 hour prior to the temperature being raised to 280° C. where it was held for 5 hours.

The resulting polyarylate-polyethylene iso/terephthalate had a reduced viscosity of 0.13 dl/g.

EXAMPLE 6

The procedure described in Example 1 was exactly repeated except that 8.95 g of polysulfone was added to the initial charge and the amount of diphenyl ether was reduced to 19.18 g.

The resulting polymer had a reduced viscosity of 0.25 dl/g.

EXAMPLE 7

The procedure described in Example 1 was repeated except that 8.95 g of polyethylene terephthalate was added to the initial charge and the amount of diphenyl ether used was reduced to 19.18 g.

The reduced viscosity of the resulting polymer was 0.12 dl/g.

In all instances higher molecular weight product could be obtained by removing the processing aid and residual phenol under reduced pressure at 250°–350° C. This could be accomplished in the reactor or an extruder, for example, a vented extruder.

What is claimed is:

1. An improved process for preparing polyesters which comprises reacting a dihydric phenol with a diester derivative of an aromatic diacid in the presence of from about 10 to about 60 weight percent of a processing aid having a boiling point of greater than about 200° C. under polyester forming conditions, wherein the improvement comprises carrying out the process in the presence of one or more thermoplastic polymers.

2. The process of claim 1 wherein the thermoplastic polymer is selected from polyesters, polycarbonates, styrene polymers, alkyl acrylate polymers, polyurethanes, poly(aryl ether) polymers, polyamides, polyimides, poly(amide imides), poly(ether imides), polyhydroxy ether polymers, and copolyetherester block copolymers.